United States Patent
Spratt

(10) Patent No.: US 6,614,393 B2
(45) Date of Patent: Sep. 2, 2003

(54) LOCATION DATA DISSEMINATION AND RECEPTION FOR ENTITIES HAVING SHORT-RANGE RECEIVERS

(75) Inventor: Michael P Spratt, Weston Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/057,742

(22) Filed: Jan. 23, 2002

(65) Prior Publication Data

US 2002/0113735 A1 Aug. 22, 2002

(30) Foreign Application Priority Data

Jan. 31, 2001 (GB) .............................. 0102417
Jul. 20, 2001 (GB) .............................. 0117700

(51) Int. Cl.[7] ........................... G01S 5/02; H04B 7/185
(52) U.S. Cl. .................. 342/357.09; 342/457; 455/456
(58) Field of Search .................. 342/357.1, 357.09, 342/457; 455/456

(56) References Cited

U.S. PATENT DOCUMENTS

| 5,375,161 A | | 12/1994 | Fuller et al. ................... 379/57 |
| 5,748,147 A | * | 5/1998 | Bickley et al. ............. 342/457 |
| 5,875,400 A | | 2/1999 | Madhavapeddy et al. ... 455/458 |
| 5,990,833 A | * | 11/1999 | Ahlbom et al. ............. 342/417 |
| 6,047,183 A | | 4/2000 | Kingdon et al. ............. 455/440 |
| 6,078,826 A | | 6/2000 | Croft et al. .................. 455/574 |
| 6,212,133 B1 | | 4/2001 | McCoy et al. ................. 368/9 |
| 6,313,786 B1 | * | 11/2001 | Sheynblat et al. ..... 342/357.02 |
| 6,411,891 B1 | * | 6/2002 | Jones ......................... 701/201 |

FOREIGN PATENT DOCUMENTS

| EP | 0 913 965 A1 | 5/1999 |
| EP | 0 948 222 A2 | 10/1999 |
| GB | 2 338 374 A | 12/1999 |
| GB | 2 342 018 A | 3/2000 |
| GB | 2 344 723 A | 6/2000 |
| GB | 2 360 914 A | 10/2001 |
| GB | 2 364 203 A | 1/2002 |
| WO | 98/12862 | 3/1998 |
| WO | 00/23816 | 4/2000 |
| WO | 01/50151 A1 | 7/2001 |
| WO | 01/63316 | 8/2001 |

OTHER PUBLICATIONS

Cochrane, P., "The Market Impact of Fundamental Technology," 9 pages (Jun. 2000).

* cited by examiner

Primary Examiner—Theodore M. Blum

(57) ABSTRACT

In order to reduce power consumption of battery-powered devices to which location data is to be dissemination by short range communication, the devices are arranged to wake-up to listen for location data at known times as judged against a reference time standard. This time standard is also available to the transmitters of location data which accordingly transmit their location data at the known times.

8 Claims, 2 Drawing Sheets

LOCATION DATA DISSEMINATION AND RECEPTION FOR ENTITIES HAVING SHORT-RANGE RECEIVERS

FIELD OF THE INVENTION

The present invention relates to the dissemination and reception of location data intended for entities with short-range receivers.

BACKGROUND OF THE INVENTION

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

One possible use for such short-range technologies is the transmission of local information to passers-by equipped with mobile devices having short-range transceivers, the local information being, for example, transmitted by a shop to inform the passers-by of current promotions. Another use is in location beacons that transmit location information to passers-by.

It is known, for example from EP-A-0,948,222, to diffuse information amongst users by short range wireless links so that a user need not be in range of an originating transmitter in order to receive the information sent out by the latter. The process of diffusion takes advantage of both the short range wireless technology and the movement of the users carrying the devices. Such an arrangement is likely to be particularly useful in environments such as shopping malls, city centers, tourist attractions, theme parks or any other location where large numbers of users carrying mobile devices with short-range transceivers are likely to be in one locality. Another important area of application is the diffusion of information between devices fixed in cars.

By applying appropriate diffusion-limiting mechanisms (for example, by assigning the original information a total time to live of, for example, 10 minutes), the information can be restricted to the vicinity of the originating point 10. This makes the diffusion process appropriate for the diffusion of location relevant information that is primarily of use only in the vicinity of point 10.

The diffused information can, of course, include the location of the originating point. For devices receiving the information directly from the originating point, this provides them with a fairly accurate indication of their location (because the information is received over a short-range link). However, as the information is diffused between devices, the newly-receiving devices get less and less accurate location information.

Our co-pending European Application 01301826.2 describes a method by which an entity receiving location data by diffusion from several different sources, can use this data to estimate its current position in dependence on the relative prominence of the sources.

Our co-pending European Application EP 01305936.5 describes another method by which an entity can discover its location using multiple items of location data received by short-range diffusion from several sources. In this method, each location data item includes an indication of the distance traveled by the location data item from its source, either by displacement of entities temporarily holding the item or by transmission. This distance represents an upper bound on the current distance of a receiving entity from the source concerned and this can be used, together with upper-bound distances from other sources, to discover a current zone where the entity is likely to be located; various averaging techniques can then be applied to derive a current location for the entity.

However, having a receiving entity continuously powered up ready to receive any location data broadcast within range is undesirable in the case of battery-powered receiving entities as this significantly reduces battery life. Accordingly, it is an object of the present invention to reduce the power consumption of a receiving entity without unduly reducing the amount of location data likely to be received.

SUMMARY OF THE INVENTION

According to one aspect of the present invention, there is provided apparatus comprising:
  a short-range receiver for receiving location data, the receiver having an activated state in which it is operative to receiver location data and a de-activated state in which at least a substantial portion of the receiver is powered down;
  a clock subsystem including an input arrangement for receiving reference-time data indicative of a time reference external to the apparatus, and a clock responsive to received reference-time data to keep an internal timing substantially coordinated with said time reference;
  a wake-up subsystem for placing the receiver in its activated state at predetermined times relative to said internal timing; and
  a location-data handling subsystem for handling location data received by the receiver.

The receiver is thus woken up at specific times with respect to the time reference, these times being chosen to be when location data is most likely to be available. As a result, power consumption is reduced which is of particular advantage for battery-powered mobile devices.

According to another aspect of the present invention, there is provided a method of disseminating location information to devices equipped with short-range receivers, the method comprising the steps of:
  disseminating reference time data for establishing a common timing reference across multiple items of equipment;
  transmitting location information by short-range communication at known times relative to said common timing reference;
  receiving said reference time data at a device and using it to synchronise an internal clock with said common timing reference; and
  powering up a short-range receiver of the device at said known times relative to the common timing reference as represented by the internal clock, in order to receive location information.

According to a further aspect of the present invention, there is provided a location system for mobile devices, comprising:
  an arrangement for disseminating absolute time;
  location-disseminating means for receiving absolute time information from said arrangement and for transmitting location information at fixed absolute times;

mobile devices for receiving and maintaining absolute time information from said arrangement and for powering up for short time windows to receive location information transmitted at said fixed absolute times.

The infrastructure used to provide the location data can also be used by apparatus that does not have a need to save power by powering down its receiver; however, in this case measures are preferably taken to minimise or prevent message transmission that would conflict with the location data transmissions. Thus, according to a still further aspect of the present invention, there is provided apparatus comprising:

a short-range transceiver;

a location-data handling subsystem for handling location data received by the transceiver;

a timing subsystem including an input arrangement for receiving reference-time data indicative of a time reference external to the apparatus, and a time-window determining arrangement for determining, with respect to said time reference, the occurrence of location-data time windows that are scheduled to occur at known times relative to said time reference; and a send control for managing the sending of messages by the apparatus using the transceiver, the send control being operative to minimise or eliminate the sending of messages during said location-data time windows determined by the determining arrangement.

BRIEF DESCRIPTION OF THE DRAWINGS

Embodiments of the invention will now be described byway of non-limiting example, with reference to the accompanying diagrammatic drawings, in which.

BEST MODE FOR CARRYING OUT THE INVENTION

Figure 1:
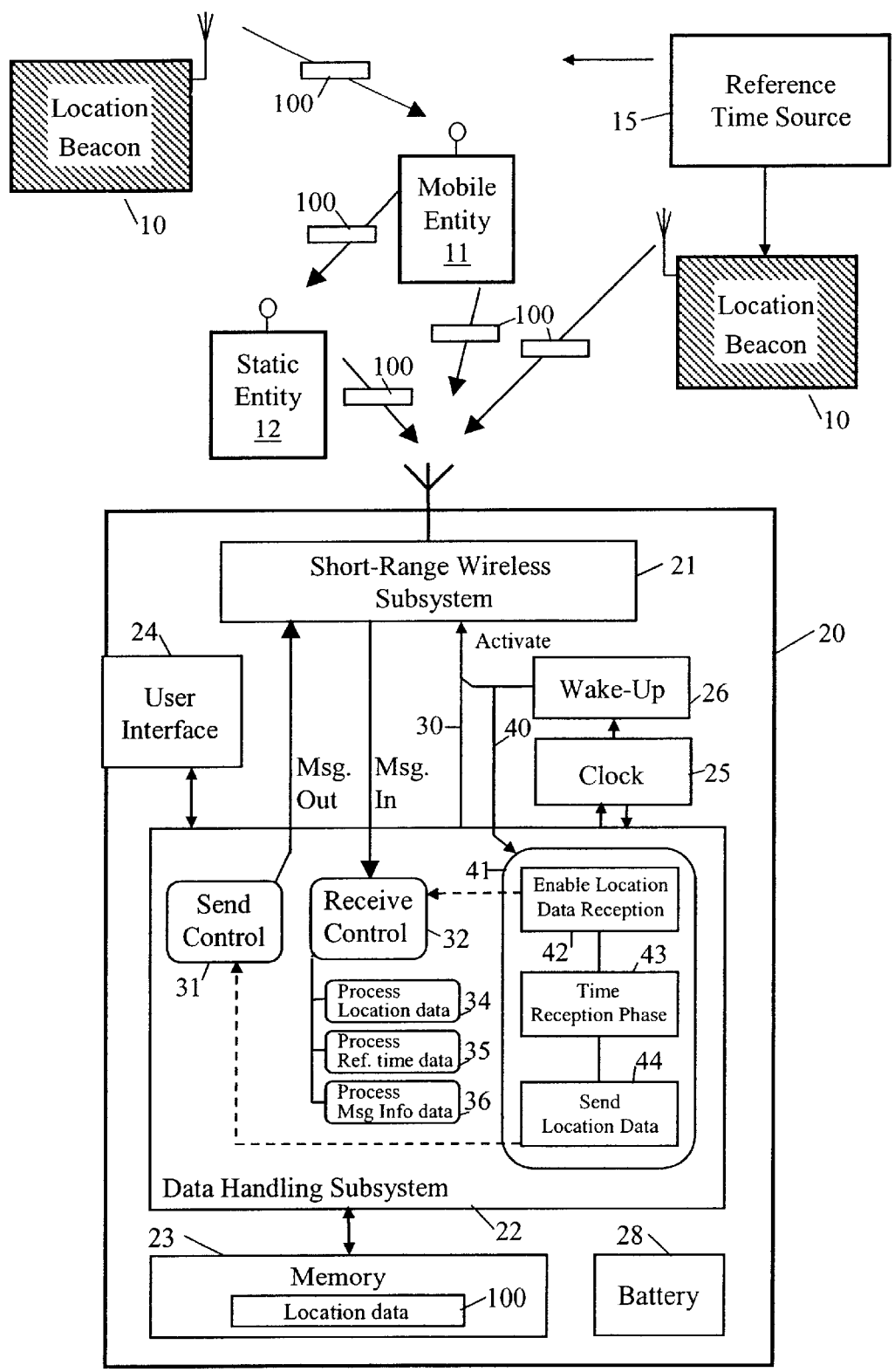
FIG. 1 is a diagram illustrating a location-dissemination system embodying the invention, the diagram also showing the related functional components of an entity, embodying the invention, for receiving location data.

FIG. 1 shows a system for disseminating location data 100 in which fixed location beacons 10 periodically transmit (for example, with fixed period P) location data using short-range wireless transmitters (for example, infra-red or Bluetooth radio transmitters). The timings of these transmissions is predetermined relative to a time reference established by a reference time source 15. The reference time source 15 communicates reference time data by any suitable means (for example, over a computer network or via a wireless broadcast signal) to enable recipient devices, including location beacons 10, to synchronize their operations relative to one another, either by directly using the reference time data to trigger operations or, more typically, by synchronizing the running of internal clocks to the reference time source. Arrangements for doing this to a level of accuracy appropriate for the present invention are well known in the art and will not be further described herein. It may be noted that the GPS satellite system can be used in this role.

The location data 100 transmitted by each location beacon 10 accurately specifies the location of that beacon. This location data is passed to and diffused between short-range communication entities that are typically mobile entities 11 but may also include static entities 12. The location data can be embedded in dedicated location-data messages or included in messages carrying other types of data. In FIG. 1, a short-range communication entity 20 is shown, by way of example, as receiving location data from a mobile entity 11, a static entity 12 and directly from a location beacon 10. How the received location data is utilized by the entity 20 is outside of the scope of the present invention The entities 11, 12 and 20 are also arranged to receive reference time data to synchronize their operation with that of the location beacons and with one another. This reference time data be passed using the short-range communication capabilities of the entities or in some other manner (thus, for example, an entity could be dockable with a computer that had network access to the reference time source and the entity could be arranged to synchronize an internal clock with the time source 15 via the intermediary of the computer).

The short-range communication entity 20 shown in FIG. 1 is an embodiment of one aspect of the present invention. Specific implementations of the entity 20 include a vehicle-based implementation, a user-carried implementation, and a static-device based implementation. In the case of a vehicle-based implementation, the functional elements of the entity can be built into the vehicle whereas in the case of the pedestrian-based implementation, the elements will generally be provided in the form of a mobile device carried by the pedestrian. Since an advantage achievable through adoption of the present invention is the reduction of power consumption of the short-range communication entities, the invention is of particular application in respect of user-carried entities as these are generally battery powered; accordingly, the entity 20 shown in FIG. 1 is depicted as being powered by battery 28.

The functional elements of the entity 20 comprise:

a short-range wireless transceiver subsystem 21 (for example, infrared-based or, preferably, radio-based such as a Bluetooth system) for receiving and (preferably) transmitting location data from/to nearby entities of similar form;

a data-handling subsystem 22 for handling the received location data 100 (typically, though not necessarily, for purposes including effecting an estimate of the current location of the entity 20);

a memory 23 for storing location data 100 received via the transceiver subsystem 21 and the data-handling subsystem 22;

a user interface 24 for controlling operation of the entity and displaying output generated by the data handling subsystem 22.

an internal clock 25 capable of being synchronized to the reference time source using reference time data received by the entity;

a wake-up circuit 26 for waking up the transceiver 21 at specified times; and battery 28 for powering the entity 20.

The data handling subsystem 22 is typically implemented as a program controlled processor for executing various processes, these processes including, in the present embodiment, processes 31–36 and 41 to be described below. However, some or all of the functionality of the data handling subsystem could alternatively be effected by dedicated circuitry and, conversely, some of the functionality represented by the other elements of the entity 20 in FIG. 1 can be implemented by processes executed by the data handling subsystem 22.

Entity 20 can be set into one of several modes by user input through user interface 24. These modes include a fully powered-down mode in which all elements of the entity are powered down, a fully-powered up mode in which all elements are powered up for operation, a stand-by mode in which the receiver is powered up to receive messages but functionality not required for this is powered, and a location-only mode to be more filly described below.

When the entity 20 is fully powered up, the transceiver 21 is operative to send and receive messages with send control process 31 (run by the data handling subsystem 22) controlling the queuing of messages to be sent and receive control process 32 (also run by subsystem 32) determining how the contents of each received message is to be handled. In particular, in the present embodiment the receive control process 32 is arranged to pass received location data (whether in a dedicated message or embedded in a message carrying other types of data) to a process 34 where it is processed as required; process 34 is also responsible for storing location data in memory 29 as appropriate.

The receive control process 32 is further operative to identify reference time data in a received message and pass this data to a process 35 which utilizes the reference time data to update clock 25 to ensure its synchronization with the reference time source 15.

Where a received message includes information content intended for presentation to the user of the entity 20, the receive control process 32 passes this content to a process 36 that is responsible for taking appropriate action (such as filtering, storing, generating user alerts, and outputting the contents via the user interface 24).

When the entity is in its standby mode, at least the receiver circuits of transceiver 21 are continuously energized and when a message is received, the data handling subsystem is powered up to handle the message.

Figure 2:
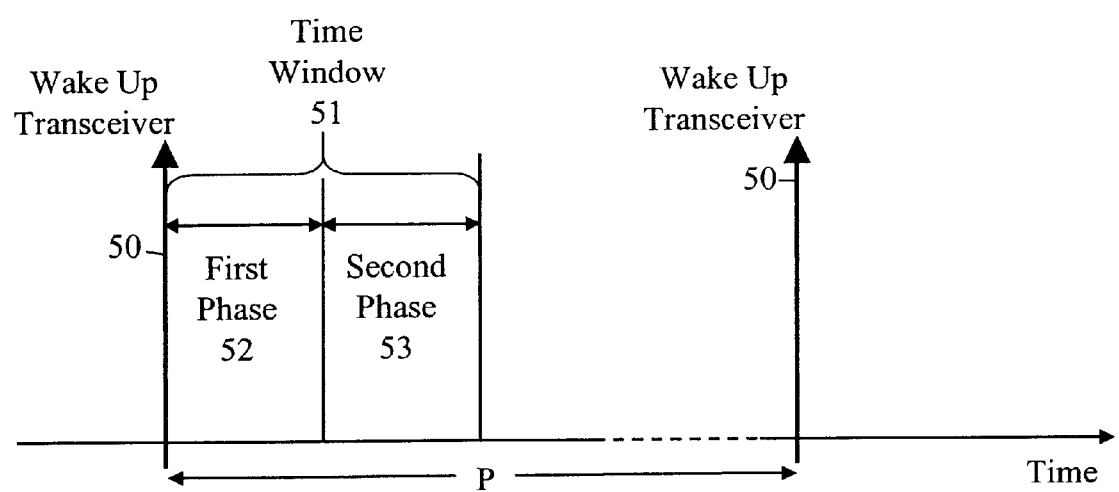
FIG. 2 is a time diagram showing periods when the FIG. 1 entity is powered up to receive location data.

However, even having the device operating in a standby mode listening for nearby devices significantly reduces battery life. On the other hand, unless a continual watch is kept for location data, the entity is unlikely to be able to give a good estimate of its location when asked for this information by its user. To overcome this conflict, when the entity 20 is set in its location-only mode, the entity 20 is arranged to periodically power up (arrows 50, FIG. 2) the receiver section of its transceiver only for a short time window 51 timed to encompass the known times when the location beacons 10 are set to transmit location data. Outside of the time window 51, the receiver (or at least a substantial part of it) is in a powered down state. By further arranging for entities 11 and 12 also to transmit their relevant location data in the time windows 51, the chances of entity 20 picking up location data in the time windows is enhanced. As will be appreciated, this arrangement relies on the coordination of the operation of the various items of equipment involved and this is achieved by virtue of ensuring that all items take their timing from the reference time source 15 and know when location data is to be transmitted relative to the timing established by that source.

Because the location beacons 15 are a more reliable source of location data than other devices such as entities 11, 12 and 20, each time window 51 is preferably divided into two phases, namely a first phase 52 in which only the location beacons 15 transmit with entities such as entity 20 being set only to receive, and a second phase 52 in which entities holding location data can also transmit it on to other entities as well as still being set to recieve. With respect to this second phase, each such entity is preferably arranged to time a random time before initiating its transmission in the second phase whereby to minimize the risk of two adjacent entities initiating transmission together (it being appreciated that the transceiver 21 will generally be arranged to defer any transmission if it is already receiving a message).

By way of example, the transceiver 21 might be powered up for 100 milliseconds (duration of time window 51) every 6 seconds (period P) so that, starting at a time t=0.0, the transceiver would be powered up from 0.0 seconds to t=0.1 seconds, t=6.0 seconds to t=6.1 seconds, t=12.0 seconds to t=12.1 seconds, and so on. For the rest of the time, the transceiver is off, so not consuming power. In fact, the end of each time window may be extended if a location message is being received at the normal end of the window.

The functionality associated with the location-only mode of entity 20 comprises the wake-up circuit 26 and process 41. Wake-up circuit 26 is arranged to determine the occurrence of the time windows 51 as judged by the internal timing established by clock 25. At the start of each time interval 51, the wake-up circuit activates the transceiver 21 (or at least the receiver section of the latter) and also initiates running of process 41. Process 41 first sets the receive control to only receive location messages or, possibly, to receive all messages but to discard message data except location data (block 42), and then starts to time the first phase of the current time window (block 43). At the end of the first phase, block 44 of process 41 initiates transmission of any location data held by the entity 20, this transmission initiation being effected after a random timeout period set between zero and the end of the time window. In fact, blocks 43 and 44 could be jointly implemented by timing a random period of a duration between the duration of the first phase 52 of the time window 51 and the overall duration of the time window.

Any location data received during the time windows 51 is passed by receive control 32 to process 34 for processing (the subsystem 22 being kept powered up until this processing is complete.

The receive control process 32 can be set by block 41 to receive not only location data but also reference time data during the time windows 51. In fact, all types of data can be received and stored but priority is given to processing location data and reference time data.

Many variations are, of course, possible to the above-described embodiments of the invention. For example, the process 34 and clock 25, which together form a timing subsystem, can be integrated with each other, Similarly the processes 36 and 41 which together with the processor on which they run, form a location-data handling subsystem, can be integrated into a single process. The data-handling subsystem 22 need not be woken up by the wake-up circuit 26 when the entity is in its location-only mode but can, instead, be arranged to be woken up by the transceiver 21 only when a message is received.

Entity 20 can, of course, be embodied only with the functionality required for the location data reception and handling where this is the sole purpose of the entity.

With respect to the location beacons 15, these need not be fixed but could be mobile devices that derive their own location by some other means (such as by using a GPS system or a cellular radio network location technique).

In the described embodiment, when entity 20 is in its location-only mode the transceiver 21 (and possibly just the receiver portion of the latter) is only powered up for short intervals in order to preserve battery power. It will, however, be appreciated that whilst this intermittent powering of the receiver is generally not required for devices powered from a mains electricity supply, such devices can still take advantage of the envisaged infrastructure arrangement for transmitting location data at predetermined absolute times. To maximise the possibility of all types of devices picking up the transmitted location data, devices that remain powered up for extended periods are preferably configured to minimise their transmissions during the time windows when location data is being transmitted. This can be done simply by not initiating any new transmissions during these time windows; however, to be more effective, where transmission of a message is set to start before a location-data transmission time window but is likely to continue on into the latter period, then message transmission should be deferred until after the end of the time window.

It may also be noted that with devices which are continuously powered up or which can otherwise continually receive reference-time data, the occurrence of the location-data time windows can be judged directly from the received reference-time data and there is no need to establish an internal device timing that is synchronised to the external time reference.

What is claimed is:

1. A method of disseminating location information to devices equipped with short-range transceivers, the method comprising automatically carrying out the steps of:
   disseminating reference time data for establishing a common timing reference across multiple items of equipment;
   transmitting location information from location beacons by short-range communication at known times relative to said common timing reference, this location information comprising, for each location beacon, the location of that beacon;
   receiving said reference time data at said devices and using it to synchronise an internal clock of each device with said common timing reference; and
   for each said device, powering up its short-range transceiver for successive limited periods starting at said known times relative to the common timing reference as represented by the internal clock of the device, and during an initial portion of each said limited period, using the transceiver to receive location information transmitted by any said location beacon within range, and after said initial portion of each said limited period using the transceiver to exchange location information with nearby devices.

2. A method according to claim 1, wherein each said device takes part in disseminating reference times data by transmitting reference time data to other devices by short-range communication.

3. A method according to claim 1, wherein each said device initiates its transmission of location data during a said limited period at a time is randomly determined within present limits.

4. A location system for mobile devices, comprising:
   an arrangement for disseminating reference-tune information indicative of a reference timing;
   location beacons each comprising means for receiving said reference-time information, and a short-range transmitter for transmitting the location of the beacons at fixed times relative to said reference timing, and
   mobile devices each comprising a short-range transceiver, means for receiving said reference-time information to maintain an internal timing reference coordinated with said reference timing, and control means for powering up the transceiver at said fixed times for short time windows both to receive the location transmitted by any nearby location beacon and, subsequent to an initial portion of each said time window, to exchange location data comprising received beacon locations with any nearby devices.

5. A system according to claim 4, wherein each said device is arranged to take part in disseminating said reference timings by transmitting reference time information to other devices by short-range communication.

6. A system according to claim 4, wherein the control means of each device is arranged to cause the tranceiver to initiate transmission of the devices location data during a said time window at a time subsequent to the said initial portion of the time window that is randomly determined within preset limits.

7. A system according to claim 4, wherein the mobile devices are battery powered.

8. A method of disseminating location information to devices equipped with short-range transceivers, the method comprising automatically carrying out the following:
   disseminating reference time data for establishing a common timing reference;
   transmitting location information from location beacons by short-range communication at known times relative to the common timing reference, this location information comprising, for each location beacon, the location of that beacon;
   receiving said reference time data at said devices and using it to synchronise an internal clock of each device with the common timing reference; and
   for each said device, powering up its short-range transceiver for successive limited periods each encompassing a respective said known time relative to the common timing reference as represented by the internal clock of the device, and during a portion of each limited period, which portion includes and extends beyond the said known time encompassed by the limited period, using the transceiver only to receive location information transmitted by any nearby location beacon, and outside of said portion of each limited period, but still within that period, using the transceiver to exchange location information with nearby devices.

* * * * *

UNITED STATES PATENT AND TRADEMARK OFFICE
CERTIFICATE OF CORRECTION

PATENT NO. : 6,614,393 B2 Page 1 of 1
DATED : September 2, 2003
INVENTOR(S) : Michael P. Spratt It is certified that error appears in the above-identified patent and that said Letters Patent is hereby corrected as shown below:

Column 7,
Line 54, change "reference-tune" to -- reference-time --

Column 8,
Line 22, change "devices" to -- device' s --

Signed and Sealed this

Twenty-first Day of June, 2005

JON W. DUDAS
*Director of the United States Patent and Trademark Office*